United States Patent [19]
Roach et al.

[11] 3,983,780
[45] Oct. 5, 1976

[54] CASTING PROPELLANT IN ROCKET ENGINE

[75] Inventors: John E. Roach, Newark, Del.; Stuart C. Froehling, Ogden, Utah

[73] Assignee: The United States of America as represented by the Administrator of the National Aeronautics and Space Administration, Washington, D.C.

[22] Filed: Nov. 14, 1962

[21] Appl. No.: 238,826

[52] U.S. Cl. ................................... 86/1 R; 102/99; 264/3 R
[51] Int. Cl.² ......................................... F42B 33/00
[58] Field of Search .................... 86/1; 102/98, 99; 60/35.6; 25/128 K; 18/45 M; 264/3 R, 94; 425/DIG. 12, DIG. 18

[56] References Cited
UNITED STATES PATENTS

| | | | |
|---|---|---|---|
| 2,107,018 | 2/1938 | Wendes | 18/45 M |
| 2,345,977 | 4/1944 | Howard et al. | 264/94 |
| 2,920,443 | 1/1960 | Higgins | 60/253 |
| 3,001,363 | 9/1961 | Thibodaux | 60/35.6 RS |

*Primary Examiner*—Harold Tudor
*Attorney, Agent, or Firm*—Howard J. Osborn; Gary F. Grafel; John R. Manning

EXEMPLARY CLAIM

1. The method of casting a solid propellant in the casing of a rocket engine of spherical form having a continuous wall with a single opening therein which comprises, forming leaves of a material which melts at a temperature below the ignition temperature of the propellant and with curved edges concentric to the curvature of the spherical casing, inserting the leaves into the spherical casing through the opening therein, assembling the leaves to form a core having a greater width than the width of the single opening and with curved peripheral edges, casting the propellant around the core, curing the cast propellant to form a solid mass, and then supplying a heating medium in heat exchange relation with the core at the interior of the casting to melt the leaves and provide a central opening with flutes projecting radially therefrom.

9 Claims, 9 Drawing Figures

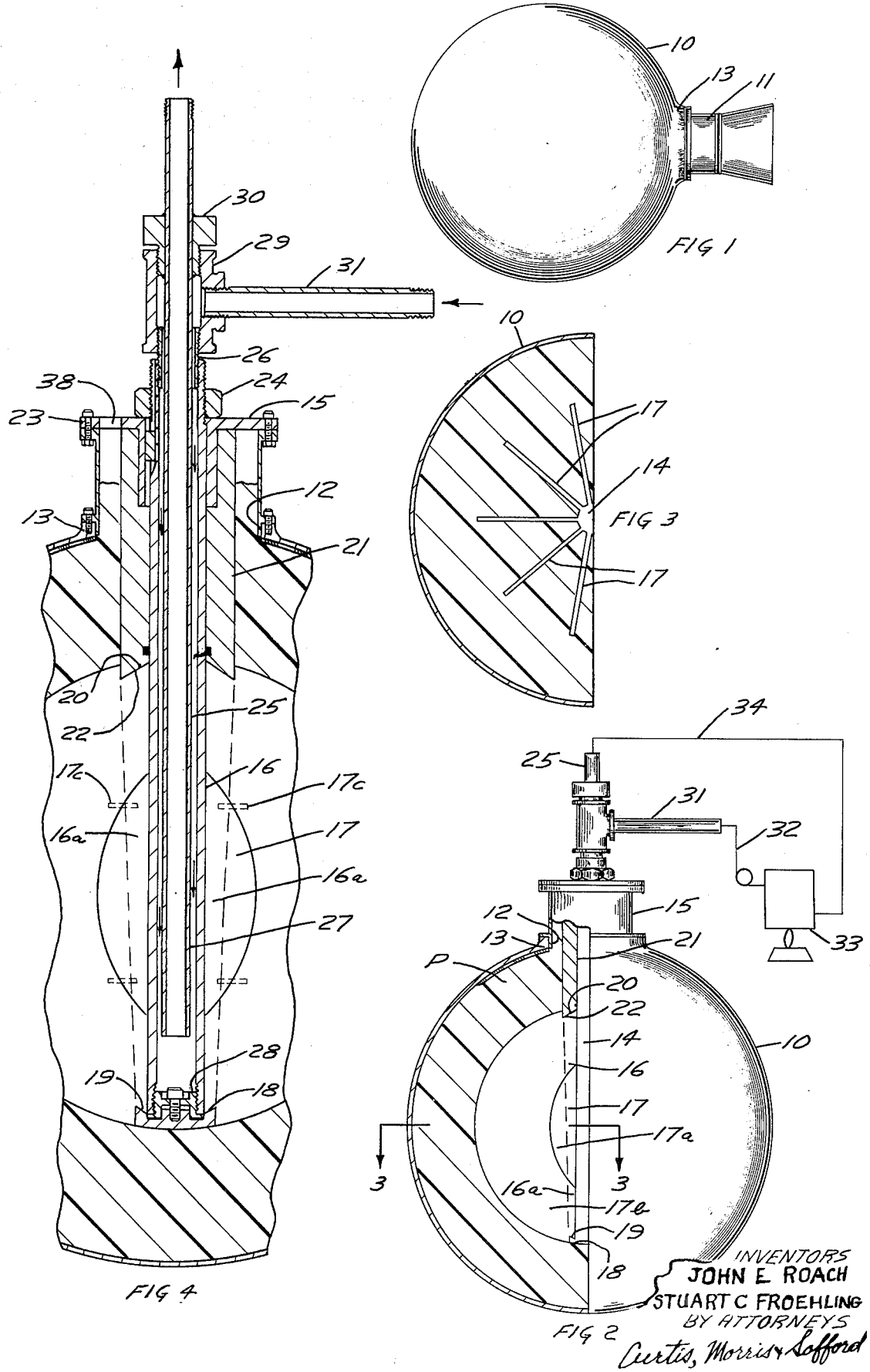

INVENTORS
JOHN E ROACH
STUART C FROEHLING
BY ATTORNEYS
Curtis, Morris & Safford

CASTING PROPELLANT IN ROCKET ENGINE

The present invention relates to rocket engines and more particularly to an improved method of and apparatus for casting solid propellants in rocket engines.

The use of solid propellants cast in the casings of rocket engines is well known and the solid propellant is usually provided with a central opening forming a combustion chamber. The chamber in the propellant is designed to produce a predetermined surface area where burning occurs and this is accomplished by providing star shaped flutes extending longitudinally along and radially from the central opening in the propellant. If the area of the burning surface is too small, an insufficient volume of gas is formed to produce the desired thrust. If the area of the burning surface is too great, the rate of burning is too rapid and may cause an explosion and destruction of the entire engine. Thus, the burning surface should be somewhere between the two extremes to produce the design conditions of a particular thrust for a given period of time to produce the desired acceleration and ultimate velocity required for the rocket engine.

The solid propellant charge of a suitable material, such as a partially polymerized polymer of a dough like consistency, is cast around a mandrel core to form a central chamber of the desired shape. To this end, the mandrel core has radially projecting ribs corresponding to the flutes to be formed in the solid propellant. After the propellant has been cast around the mandrel and cured to a solid state, the mandrel is withdrawn to form a central opening of the same shape as the mandrel.

The above described method operates satisfactorily when the opening in the rocket engine casing is larger than the width of the mandrel core and when the flutes extending axially are of the same or diminishing widths from the opening in the engine casing toward the opposite end. However, such a method of casting a propellant cannot be used if the mandrel core is of a greater width than the opening in the rocket engine casing, or if the edges of its radially projecting ribs are curved as, for example, when propellant is cast in a casing of spherical shape. Rocket engine casings of a spherical shape have certain advantages over engine casings of conventional cylindrical form as they will hold a greater weight of propellant in a given volume of the engine casing. Heretofore, it has been necessary to fabricate such spherical engines in separate hemispheres and then weld the hemispheres at the edges. However, this method of fabrication has not been satisfactory as it interferes with most welding techniques and heat treatment of the joint which is necessary to produce the required strength.

One of the objects of the present invention is to provide a novel method of and apparatus for casting solid propellants which adapts the propellant to be cast in a one piece spherical or other shaped casing with a central chamber of greater width than the opening in the casing.

Another object is to provide a novel method of and apparatus for casting solid propellants in rocket engine casings which permits the use of a mandrel core having curved and irregular shaped surfaces extending radially from its axis.

Still another object is to provide an apparatus for casting solid propellants in a rocket engine casing which is of relatively simple construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

IN THE DRAWINGS

FIG. 1 is a side view of a rocket engine having a casing of spherical shape and incorporating the novel features of the present invention.

FIG. 2 is a side elevational view of the rocket engine partly in section and showing the sectional construction of the mandrel core having curved edges projecting radially beyond the edges of the opening in the casing;

FIG. 3 is a transverse sectional view of a segment of the engine casing taken on line 3—3 of FIG. 2 to show the radial arrangement of the mandrel core leaves on the core spline to form star points in the propellant;

FIG. 4 is an enlarged view through a portion of the casing and mandrel core illustrated in FIG. 2 to show the manner in which the leaves are clamped in slots in the central shaft and the passages in the central shaft through which a heating medium may be circulated.

Figure 5:
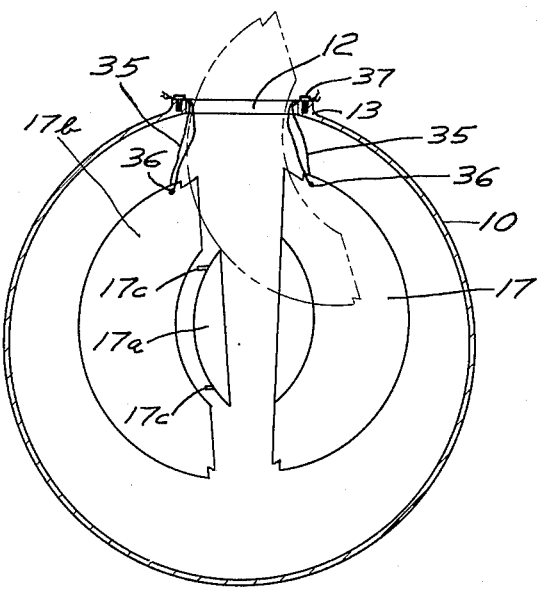
FIG. 5 is a sectional view through the spherical engine casing showing the steps of inserting the leaf sections of the mandrel core into the casing and assembled them therein.

The method of the present invention is directed to casting a material in a vessel around a mandrel core of a size and shape that prevents it from being freely withdrawn from the casting. A particular field of application of the method of the invention is the casting of solid propellant in a rocket engine casing around a mandrel having circumferentially spaced and radially projecting fins with round edges. By way of example, the method of the present invention is herein illustrated and described as applied to casting a solid propellant in a rocket engine casing of spherical shape.

In general, the method comprises the steps of fabricating the mandrel in separate parts of a size and shape to adapt the parts to be inserted individually through the opening of limited area in the engine casing. Those parts of the mandrel which project radially from a central shaft or which will not withdraw freely from the casting are composed of a meltable material, such as metal alloy having a low melting temperature, that is solid at the temperature of the propellant being cast, but adapted to melt at a temperature below the ignition temperature of the cast propellant. The parts of the mandrel inserted into the engine casing separately are then assembled therein to form a complete mandrel core and positioned centrally in the casing. The propellant is poured into the casing around the mandrel core and cured to form a solid casting of the propellant on the inner wall of the engine casing. After the propellant has attained a solid state, a heating medium is circulated in heat exchange relation with the mandrel core to melt the radially projecting portions. The solid portions of the mandrel are then withdrawn and the engine casing inverted to pour the molten portions of the mandrel therefrom. The resulting casting of solid propellant in the engine casing then has a hollow chamber at its center with circumferentially spaced radial flutes corresponding to the original shape of the mandrel core to provide the surface area required for burning at the desired rate.

More specifically, the steps of the method are shown in the drawings and hereinafter described in conjunction with one form of apparatus used to practice the invention. For purposes of illustration, the invention is shown applied to a rocket engine casing of spherical shape, but it will be understood that the invention may have other applications, or the rocket engine casing may have other shapes. Referring to the drawings, the rocket engine casing 10 is of a unitary one piece construction without seams and having a nozzle 11 at one side as shown in FIG. 1. Nozzle 11 surrounds an opening 12 in the engine casing, see FIGS. 2 and 4, and is detachably connected to a boss 13 around the opening by suitable fastening means such as screws. When the propellant is to be cast, the nozzle 11 is removed and a mandrel core 14 is mounted in the casing by a fitting 15 seated on the boss 13.

As shown in FIGS. 2 and 4 the mandrel core 14 comprises a central hollow shaft 16 supported by the fitting 15 with one end projecting into the spherical engine casing 10 and the opposite end projecting outwardly from the casing. The shaft 16 has a plurality of longitudinal slots 16a and a plurality of leaves or fins are mounted in the slots at the end of the shaft 16 projecting into the engine casing in circumferentially spaced relation, see FIG. 3, and project radially therefrom. As will be observed by reference to FIG. 2, the leaves 17 have curved outer edges concentric with the curvature of the spherical casing. As shown most clearly in FIG. 4, the lower end of the shaft 16 has an annular clamping shoulder 18 engaging notches 19 at one end of the leaves 17; and the opposite ends of the leaves are engaged by annular shoulder 20 on the lower end of a collar 21 engaging correspondingly shaped notches 22 in the leaves. Collar 21 surrounds shaft 16 and depends from a bushing 23 constituting part of the fitting 15 for mounting the shaft. Also constituting part of the fitting 15 is a nut 24 having a screw threaded engagement with threads on the upper end of the shaft 16 for adjusting the latter and leaves 17 mounted thereon to center the mandrel core in the casing.

A sleeve 25 is positioned in the hollow shaft 16 by means of a spacing coupling 26 projecting into the upper end of shaft and surrounding the sleeve to position the sleeve axially of the shaft and provide an annular space 27 therebetween. The lower end of the shaft 16 is closed by a plug 28, see FIG. 4, and the lower end of the sleeve 25 is spaced from the plug to provide an opening therebetween. A Tee fitting 29 is connected between the spacing coupling 26 and a bushing 30 and the entire assembly surrounds the sleeve 25 which, in turn, projects beyond the upper end of shaft 16 and forms a discharge conduit. The Tee fitting 29 has a nipple 31 connected through a line 32 to a source of heating medium, such as a water heater 33, and the outer end of the sleeve 25 is connected to the water heater through a line 34 to complete a circuit for the circulation of hot water along the shaft 16 and back through the sleeve 25.

In accordance with the method of the present invention, the leaves 17 of the mandrel core 14 are made in separate parts 17a and 17b of a material having a low melting temperature. The separate parts 17a and 17b are of a size to adapt them to be inserted through the opening 12 in the rocket engine casing 10 as illustrated in FIG. 5. As will be observed by reference to FIG. 5, one section 17a of the leaf 17 is of a convex shape while the other section 17b is of a concavo-convex shape. Sections 17b of the plurality of leaves 17 are individually inserted into the engine casing 10, see FIG. 5, and supported in an approximate position by means of wires 35 extending through small holes 36 in the segments and attached to screws 37 in tapped holes in the boss 13. The convex segments 17a are then inserted into the casing 10 and attached manually to the segments 17b by means of dowel pins 17c in the manner illustrated in FIG. 5. Thus, leaves or fins 17 of a size greater than that which could be inserted through the opening 12 may be used by assembling the segments in the manner explained. The assembled leaves 17 corresponding to the number of flutes to be formed in the casting are supported in circumferentially spaced relation and dangle from the supporting wires 35.

The parts 17a and 17b of the leaves 17 are composed of a material having a melting temperature above the temperature at which the propellant is cast and below the ignition temperature of the propellant. One material which has been found quite satisfactory is a metal alloy which melts in the range of 178°F to 185°F. The parts 17a and 17b of the leaves are cast to the convex and concavo-convex form illustrated.

Figure 6:
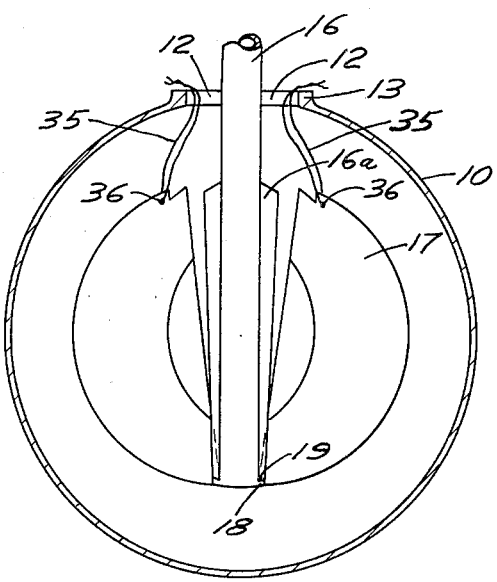
FIG. 6 is a view similar to FIG. 5 showing the steps of mounting one end of the mandrel leaves on the end of the mandrel shaft.
Figure 7:
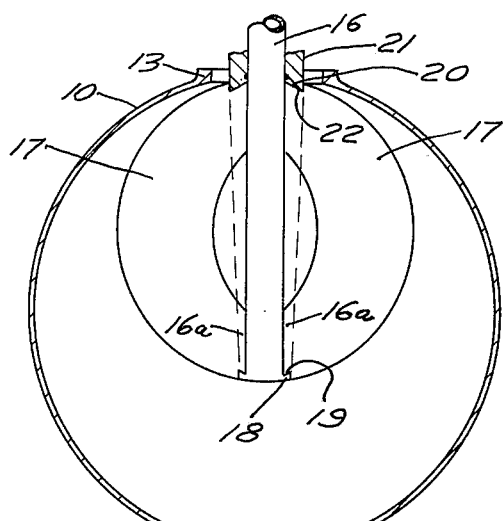
FIG. 7 is a view similar to FIGS. 5 and 6 showing the shaft and leaves drawn upwardly toward the opening to cam the inner edges of the leaves into the slots in the shaft and the collar to clamp the opposite end of the assembled leaves to the shaft.

In the next step of the method as shown in FIG. 6, the end of the shaft 16 is inserted into the engine casing 10 through the opening 12 until the annular shoulder 18 is positioned below the lower ends of the leaves 17. Shaft 16 is then raised and the notches 19 at the lower ends of the leaves 17 are manually guided to engage them with the shoulder 18 at the lower end of the shaft 16 in the manner illustrated in FIG. 6. When all of the leaves 17 are engaged with shoulder 18, the shaft 16 and assembled leaves are raised so that the upper ends of the leaves engage the rim of the casing at the periphery of the opening 12 to cam them inwardly and into the slots 16a in the sides of the shaft in the manner illustrated in FIG. 7. Collar 21 is then slid downwardly on the shaft 16 to engage its annular shoulder 20 with the notches 22 in the upper ends of the leaves 17 to positively clamp all of the leaves in the slots on the shaft as shown in FIG. 7. This operation completes the assembly of the mandrel core in the rocket engine casing 10 and the assembly may be lowered by means of nut 24, see FIG. 4, until the mandrel core 14 is centered in and the curved edges of the leaves are concentric with the spherical engine casing 10. The assembly is then held in position by the fitting 15 which, in turn, seats on the boss 13 and is attached thereto by fastening screws.

Figure 8:
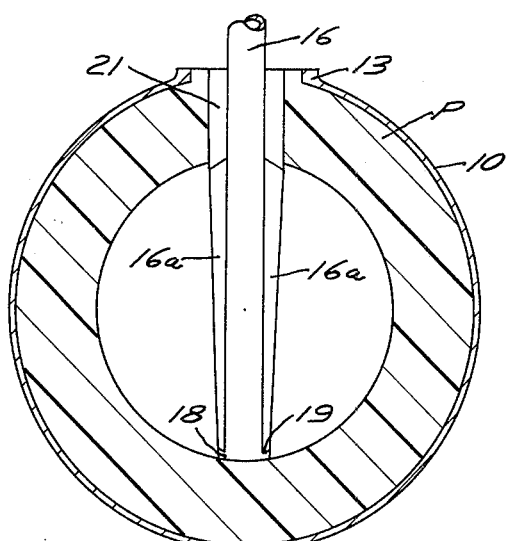
FIG. 8 is a view similar to FIGS. 5 to 7 and showing the propellant cast around the core and the leaves being melted by the circulation of a heating medium through the shaft.

The propellant in the form of a dough-like mass is then poured through a hole 38 in the bushing 23, see FIG. 4, into the annular space between the bushing and fitting and between the mandrel core 14 and the wall of the engine casing 10 until the space is completely filled with the propellant as shown in FIG. 8. The poured propellant is then cured by aging and/or other treatment until it forms a relatively solid mass which will retain its shaped after the mandrel core is removed.

Figure 9:
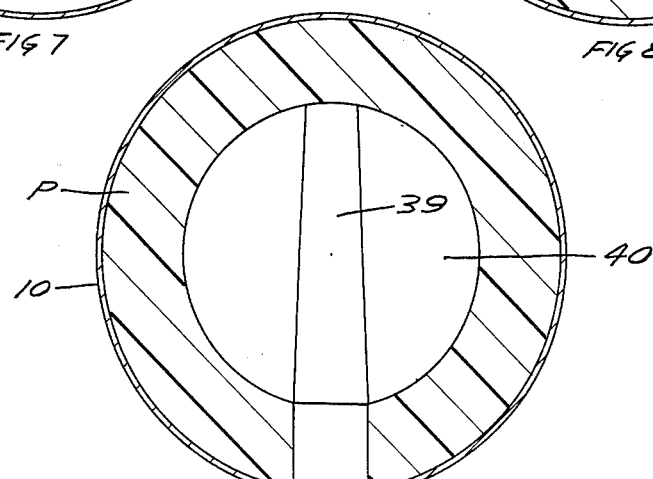
FIG. 9 shows the clamping collar and shaft withdrawn and the engine casing inverted to pour the molten leaves from the cast propellant.

The mandrel core 14 is removed by melting the leaves 17, withdrawing shaft 16 and pouring the molten leaves from the casting. The leaves 17 are melted by supplying a heating medium, such as hot water in the illustrated embodiment, and circulating the water in heat exchange relation with the leaves. To this end heat is supplied to the water heater 33 to provide water at a temperature of, for example 195°F, or approximately 10°F above the melting temperature of the alloy material of the leaves or fins 17. The hot water is then circulated from the water heater 33 through the line 32 and nipple 31 into the annular space 27 between the hollow shaft 16 and sleeve 25. The water flows along the hollow shaft 16 to the end of the sleeve 25 and in heat exchange relation with the edges of the leaves 16 in slots 16a and in contact with the end portion of the shaft. The water then flows back through the sleeve 25 and line 34 to the water heater 33 for reheating. The recirculation of hot water is continued for a period of time until the leaves have been completely melted. After melting of all of the material of the leaves 17 occurs at a temperature below the ignition temperature of the propellant, the circulation of hot water is discontinued, the fitting 15 released and the shaft 16 withdrawn from the casting. As the shaft has no radial projections except the shoulder 18 projecting into the molten leaves 19, the shaft may be easily withdrawn from the engine casing 10. Following the removal of the shaft 16 the entire engine casing 10 is inverted and the molten metal poured therefrom in the manner illustrated in FIG. 9. This completes the casting operation which leaves a casting P of solid propellant on the wall of the rocket engine 10, see FIG. 9, having a central core opening 39 with circumferentially spaced radial flutes 40 concentric with the spherical casing 10. After the molten material is poured from the engine casing 10, the latter is turned to its upright position and the nozzle 11 attached to the boss 13 to provide the rocket engine illustrated in FIG. 1 which may be fired by igniting the propellant. The core opening 39 and radial flutes 40 then provide the surface area required for proper burning of the propellant.

It will now be observed that the present invention provides a method of and apparatus for casting solid propellants in a rocket engine casing of spherical shape and having a central chamber of width greater than the width of the opening through which the propellant is poured. It will further be observed that the present invention permits the use of a mandrel core having curved and irregular shaped surfaces extending radially from its axis. It will still further be observed that the present invention provides an apparatus for casting propellant in a rocket engine which is of relatively simple construction, economical to manufacture and one which is reliable in operation.

While a single embodiment of the invention is herein illustrated and described, it will be understood that changes may be made in the steps of the method and form of the apparatus used to practice the invention without departing from the spirit or scope of the invention. Therefore, without limitation in this respect the invention is defined by the following claims.

We claim:

1. The method of casting a solid propellant in the casing of a rocket engine of spherical form having a continuous wall with a single opening therein which comprises, forming leaves of a material which melts at a temperature below the ignition temperature of the propellant and with curved edges concentric to the curvature of the spherical casing, inserting the leaves into the spherical casing through the opening therein, assembling the leaves to form a core having a greater width than the width of the single opening and with curved peripheral edges, casting the propellant around the core, curing the cast propellant to form a solid mass, and then supplying a heating medium in heat exchange relation with the core at the interior of the casting to melt the leaves and provide a central opening with flutes projecting radially therefrom.

2. The method of casting a solid propellant in the casing of a rocket engine in accordance with claim 1 in which the leaves are formed of a material having a melting point between 180°F and 190°F, casting the solid propellant in liquid phase at a temperature not exceeding 150°F, and circulating hot water in heat exchange relation to the leaves at a temperature above 190°F to melt the leaves.

3. The method of casting solid propellant in the casing of a rocket engine in accordance with claim 1 in which the casing is turned to an upright position with the opening at the top when the solid propellant is cast, circulating hot water at a temperature above the melting point of the leaves in heat exchange relation therewith to melt the leaves, and then turning the rocket engine casing upside down to pour the molten leaves from the cast propellant through the opening in the casing.

4. The method of casting solid propellant in the casing of a rocket engine having a continuous wall with a single opening therein which comprises, forming leaves of a material which melts at a temperature below the ignition temperature of the propellant, inserting the leaves into the casing through the opening theren, assembling the leaves to form a hollow mandrel core with radially extending ribs formed by the leaves of greater width than the width of the opening, casting the propellant around the core, curing the cast propellant to form a solid mass, and circulating water through the hollow mandrel core at a temperature greater than the melting point of the material forming the leaves to melt the material and provide correspondingly shaped flutes in cast propellant.

5. Apparatus for casting solid propellant in a rocket engine casing having an opening therein to provide a star-shaped combustion chamber at the center of the casting comprising, a hollow shaft, means for mounting the shaft on the engine casing to project into the casing at the center of the opening therein, leaves extending radially in circumferentially spaced relation from the hollow shaft, means at the periphery of the shaft for mounting the leaves thereon to form a casting core, said leaves being formed of a material which melts at a temperature below the ignition temperature of the propellant and said propellant being poured into the casing around the core at a temperature below the melting temperature of the leaves, said cast propellant when cured forming a solid mass around said core, and passages in said hollow shaft for delivering a heating medium to the interior of the core to melt the leaves whereby to adapt said circumferentially spaced radially extending leaves to be poured from the casting after the shaft has been withdrawn.

6. Apparatus for casting a solid propellant in a hollow rocket engine of spherical shape to form an open star-shaped combustion chamber with circumferentially spaced flutes and curved edges concentric to the spherical casing comprising, a hollow shaft, means for mounting the shaft on the engine casing with one end projecting into the casing through an opening therein and the opposite end projecting outwardly from the casing, leaves for forming the circumferentially spaced flutes, means at the sides of the shaft at the interior of the casing for mounting the leaves in radially extending circumferentially spaced heat exchange relation therewith to form a casting core, said leaves being composed of a metal adapted to melt at a temperature above the casting temperature and below the ignition temperature of the propellant, and passages in said hollow shaft for delivering a heating medium to the interior of the core to melt the leaves whereby to adapt said circumferentially spaced and radially extending leaves to be poured from the casting after the shaft has been withdrawn from the propellant.

7. Apparatus for casting solid propellant in a rocket engine in accordance with claim 6 in which the means for mounting the circumferentially spaced radially extending leaves comprises circumferentially spaced slots on the periphery of the shaft, clamping means on the shaft for engaging one end of the leave, and a collar on the shaft having a shoulder for engaging the opposite ends of the leaves to clamp them on the shaft.

8. Apparatus for casting a solid propellant in a rocket engine in accordance with claim 6 in which the passages in the hollow shaft are formed by a sleeve in the hollow shaft, a nipple connecting the space between the shaft and sleeve to the exterior of the casing, and an opening in the sleeve at the inner end of the shaft through which the heating medium may flow into the inner sleeve whereby said heating medium can be continuously supplied to the annular space between the shaft and sleeve and exhausted from the inner sleeve.

9. Apparatus for casting solid propellant in a rocket engine casing in accordance with claim 8 in which the heating medium is hot water, a water heater, and means for circulating water from the water heater through the shaft and inner sleeve.

* * * * *